United States Patent
Takano et al.

(12)

(10) Patent No.: US 6,365,219 B1
(45) Date of Patent: Apr. 2, 2002

(54) TEA EXTRACTS STABILIZED FOR LONG-TERM PRESERVATION AND METHOD OF PRODUCING SAME

(75) Inventors: Tetsuo Takano; Rieko Kaneko, both of Tokyo (JP)

(73) Assignee: Unicafe Inc., Tokyo (JP)

( * ) Notice: Subject to any disclaimer, the term of this patent is extended or adjusted under 35 U.S.C. 154(b) by 0 days.

(21) Appl. No.: 09/487,052

(22) Filed: Jan. 19, 2000

(30) Foreign Application Priority Data

May 13, 1999 (JP) ............................ 11-132596

(51) Int. Cl.⁷ .............................. A23L 2/00; A23F 3/00
(52) U.S. Cl. ..................... 426/597; 426/330.3
(58) Field of Search .............................. 426/597, 330.3, 426/329

(56) References Cited

U.S. PATENT DOCUMENTS 4,051,267 A * 9/1977 Jongeling
6,024,991 A * 2/2000 Lehmberg et al.

FOREIGN PATENT DOCUMENTS

| JP | 50154462 | | 12/1975 |
| JP | 339043 | | 2/1991 |
| JP | 4311348 | | 11/1992 |
| JP | 7303450 | | 11/1995 |
| JP | 8-174 | * | 1/1996 |
| JP | 9154490 | | 6/1997 |

* cited by examiner

Primary Examiner—Anthony J. Weier
(74) Attorney, Agent, or Firm—Dilworth & Barrese LLP

(57) ABSTRACT

Disclosed are tea extracts which do not form precipitates or change their taste even after long-term preservation, as well as a method of producing the same. Carrageenan is added to tea extracts to suppress formation of insoluble matters.

15 Claims, No Drawings

TEA EXTRACTS STABILIZED FOR LONG-TERM PRESERVATION AND METHOD OF PRODUCING SAME

BACKGROUND OF THE INVENTION

1. Field of the Invention

The present invention relates generally to tea extracts which are stabilized for long-term preservation and a method of producing the same, and more particularly, to tannin containing tea extracts not allowing creation of any precipitates during long-term preservation, as well as a method of producing the same.

2. Description of the Related Art

Tea extracts, which contain tannin, such as black tea, green tea, and oolong tea are obtained by extracting tea leaves with hot water, followed by treating the crude extracts, for example, by filtration, refrigeration, and centrifugation to remove small particles of tea leave and insoluble solid matter to consume as goods to drink directly from cans or PET containers, or after dilution of sterile thick extracts which are packed in paper containers and BIB (bag-in-box) containers and as thick extracts which are packed and frozen in 20-L cans or drums for raw material.

These extracts, however, contain caffeine, proteins, and polysaccharides, all of which combine with tannin contained by heating during production, air temperature change during preservation, temperature change during refrigeration and freezing, and by time, to form aggregates or precipitates, deteriorate their commercial value visually, and change by their taste because of precipitation of bitter components.

These phenomena occur especially in thick tea extracts. When tea extracts which are packed, for example, in drums for raw material are diluted to produce, for example, drinks, many steps such as filtration and centrifugation can be needed to remove insoluble solid matter formed, yield is lowered to remove precipitates, and important components for taste might be removed. If tannin and/or caffeine are/is removed, characteristic flavor and/or bitter taste can be lost, and balance of components might be damaged.

Precipitates can damage commercial value in the following ways: 1) Precipitates can damage by turbidity or precipitates visually and/or by giving misunderstanding that the goods are contaminated. 2) In case a thick tea extract is diluted to drink, taste and color of the obtained diluted extract can vary with the amount of precipitates. 3) When tea extracts are filled in containers, precipitates formed can narrow the outlet port, so that the filling amount can be lowered.

Therefore, the following methods have been proposed as methods for producing tea extracts by preventing generation of precipitates during long-term preservation: Tea extracts have been treated with tannase, cellulase, hemicellulase, xylanase, and/or pectinase, followed by removing precipitates using a cation-exchange resin (See Japan Patent Laid-Open S50-154462). To tea extracts is added ascorbic acid to lower the pH, the resulting mixture is chilled, and precipitates formed are removed, for example, by centrifugation, followed by neutralizing the pH (See Japan Patent Laid-Open H4-311348). The pH of a tea extract is lowered, the obtained mixture is chilled rapidly, to which are added oxidase and tannase, and the obtained mixture is incubated to remove precipitates (See Japan Patent Laid-Open H7-303450).

Each of the above-mentioned methods, however, is not enough to prevent formation of precipitates during treatments such as heating and freezing and long-term preservation or during circulation, especially for thick tea extracts which are diluted to drink.

In addition, formation of precipitates depends on the quality of the raw material tea leaves, the concentration of the tea extract, and the condition during preservation, so that removing the precipitates can cause production of ununiform products with respect to taste and turbidness. Therefore, removing the precipitates does not contribute to stabilize the quality of products.

SUMMARY OF THE INVENTION

It is therefore the object of the present invention to solve these problems, which could be successfully achieved.

The applicant(s) found that formation of precipitates is remarkably prevented by adding carrageenan to tea extracts, and that if this method is combined with prior arts such as precipitate-removing by refrigeration and treatment with tannase, turbidness or precipitate is not formed even under severer conditions.

The present invention comprises adding carrageenan to tea extracts which contain tannin, by which insolubilization of proteins and polysaccharides which are contained in the tea extracts by heating and freezing, and/or aggregation of proteins and polysaccharides with tannin, for example, during long-term preservation can be prevented, wherein carrageenan is added for the action different from prevention of physical aggregation or precipitation of components by adding the thickener. Therefore, a very low concentration, for example at 0.0005–0.3 wt. %, of carrageenan is effective which does not enhance the viscosity of the tea extracts. Carrageenan which contains 30–100 wt. % kappa-type carrageenan is preferable for the present invention.

Tea extracts which contain soluble solid matter at 0.2–18 Bx or so are preferably applicable to the present invention which include ones which are drunk without dilution and ones which are drunk after dilution.

The present invention also comprises, to enhance stability, 1) tea extracts which are obtained by chilling crude tea extracts prior to addition of carrageenan, followed by removing turbidness-giving components, 2) tea extracts which are obtained by adding tannase prior to addition of carrageenan, and 3) tea extracts which are obtained by adding tannase prior to chilling crude tea extracts, followed by chilling the crude tea extracts to remove turbidness-giving components.

DESCRIPTION OF THE PREFERRED EMBODIMENT

Examples of the present invention are described below.

EXAMPLE 1

In order to know a possible effect of adding carrageenan and an effective concentration of carrageenan, the following two items were evaluated with tea extracts after addition of various concentrations of carrageenan: 1) formation of precipitates and 2) taste.

Two hundreds g of leaves of black tea was extracted with 2 L of hot water at 70° C. to give an extract having a Bx of 3.3, a pH of 4.9, and containing 536 mg of tannin. To the obtained extract was added carrageenan at one concentration selected from 0.0005 wt. %, 0.01 wt. %, 0.15 wt. %, and 0.3 wt. %. The pH of each of the resulting mixtures was then adjusted to 6.5 with sodium bicarbonate. The volume of each of the resulting mixtures was adjusted to 2 L with water. Each of the resulting mixtures was heat sterilized at 130° C. for 30 sec to give samples 1, 2, 3, and 4, respectively. These samples were aseptically filled in plastic containers, and the above-mentioned items were evaluated immediately after sterilization, after preservation at 5° C. after 30 days, and 30° C. after 30 days. A tea extract to which carrageenan was not added was designated as control 1.

Evaluation was carried out after diluting the samples prepared as described above to a concentration which is suitable to drink. Taste was evaluated particularly with bitterness as compared with control immediately after the sterilization according to the following category levels: 1, better; 2, rather better; 3, even: 4, rather worse, 5, worse. Formation of precipitates was evaluated by taking 20 ml of each sample controlled at 20° C., leaving the sample for 60 min, followed by observing precipitates as follows: o, no precipitates; Δ, dispersedprecipitates; x, aggregated precipitates. The result is summarized in Table 1.

and, as a result, formation of precipitates and kept taste such as bitterness. With respect to control 1, precipitates which formed after preservation were not redissolved by dilution with water, and the taste was deteriorated because of loss of richness and bitterness compared with control 1 immediately after sterilization. In case carrageenan was added at 0.3 wt. % (sample 4), precipitates were not formed, but enhanced viscosity at 0.3 wt. % lowered mixing property in dilution, and gave unnatural taste to lower palatability. Addition of carrageenan at <0.3 wt. % did not give unnatural taste. It was confirmed that taste is not deteriorated if attention is paid to increase in viscosity is also important for taste.

EXAMPLE 2

Effects of addition of carrageenan at various concentrations of soluble solid matter (as measured in Bx) in tea extracts on formation of precipitates and taste were then investigated.

Two kg of leaves of black tea was extracted with hot water at 70° C. to give an extract having a Bx of 3.3, a pH of 4.9, and containing 536 mg of tannin. The obtained extract was diluted with water or condensed using an evaporator so as to contain various concentrations of soluble solid matter. The pH of each of the obtained extract was adjusted to 6.5 with sodium bicarbonate. Carrageenan was added to each of the obtained extracts at 0.05 wt. %. Each of the obtained extracts was heat-sterilizedat 135° C. for 30 sec to give samples 5–9. These samples were evaluated immediately after the sterilization, 30 days after preservation at 5° C., and 30 days

TABLE 1

|  | Concentration of carrageesan (wt %) | Immediately after sterilization | | After storage at 5° C. for 30 days | | After storage at 30° C. for 30 days | |
| --- | --- | --- | --- | --- | --- | --- | --- |
|  |  | Formation of insoluble matter | Taste | Formation of insoluble matter | Taste | Formation of insoluble matter | Taste |
| Control 1 | — | Δ | 3 | x | 5 | x | 4 |
| Sample 1 | 0.0005 | o | 3 | x | 4 | Δ | 3 |
| Sample 2 | 0.01 | o | 3 | Δ | 3 | o | 3 |
| Sample 3 | 0.15 | o | 3 | o | 3 | o | 2 |
| Sample 4 | 0.3 | o | 4 | o | 4 | o | 4 |

As shown in Table 1, control 1 had already turbidness immediately after sterilization, and the turbidness increased during preservation to give precipitates. In case carrageenan was added, insoluble solid matter was not formed except the case where carrageenan was added at 0.0005 wt. %, where a small amount of turbidness was observed after the extract was stored at 5° C. for 30 days. It was confirmed that addition of carrageenan prevented formation of turbidness after preservation at 30° C., where in said preservation was carried out in sterile plastic containers. A tea extract to which carrageenan was not added was designated as control 2. Samples 5, 6, 7, 8, and 9 contained soluble solid matter (Bx) at 0.2, 1.5, 3.1, 9.3, and 18.2, respectively.

Tea extracts thus prepared were diluted to a concentration suitable to drink, and evaluated by the method described in Example 1. The result is summarized in Table 2.

TABLE 2

|  | Concentration of carrageesan (wt %) | Immediately after sterilization | | After storage at 5° C. for 30 days | | After storage at 30° C. for 30 days | |
| --- | --- | --- | --- | --- | --- | --- | --- |
|  |  | Formation of insoluble matter | Taste | Formation of insoluble matter | Taste | Formation of insoluble matter | Taste |
| Control 2 | 3.0 | Δ | 3 | x | 5 | x | 4 |
| Sample 5 | 0.2 | o | 3 | o | 3 | o | 3 |

TABLE 2-continued

|  | Concentration of carrageesan (wt %) | Immediately after sterilization | | After storage at 5° C. for 30 days | | After storage at 30° C. for 30 days | |
| --- | --- | --- | --- | --- | --- | --- | --- |
|  |  | Formation of insoluble matter | Taste | Formation of insoluble matter | Taste | Formation of insoluble matter | Taste |
| Sample 6 | 1.5 | ○ | 3 | ○ | 3 | ○ | 3 |
| Sample 7 | 3.1 | ○ | 3 | Δ | 3 | ○ | 3 |
| Sample 8 | 9.3 | ○ | 3 | Δ | 3 | ○ | 3 |
| Sample 9 | 18.2 | Δ | 4 | Δ | 5 | Δ | 4 |

As shown in Table 2, control 2 had already turbidness immediately after sterilization, and the turbidness increased and gave precipitates during preservation. With respect to sample 9 (soluble solid matter 18.2 (Bx)), slight turbidness was generated, and taste was deteriorated. This result is due to condensation, not to addition of carrageenan. Therefore, it was confirmed that carrageenan could prevent formation of turbidness and precipitates and deterioration of taste during preservation at a wide range of concentration of soluble solid matter in samples 5–9 (soluble solid matter 0.2–18.2 (Bx)).

EXAMPLE 3

To know a possible effect of addition of carrageenan when a tea extract was obtained ab initio at a concentration suitable to drink, and carrageenan was added to the extract at a low PH, evaluation was carried out with respect to formation of precipitates and taste.

Twenty g of leaves of black tea was extracted with 2 L of hot water at 80° C. to give an extract having a Bx of 0.4 and a pH of 5.1, and containing 54 mg of tannin. To the extract was added carrageenan at 0.002 wt. %. The pH of the resulting mixture was adjusted at 5.8 with sodium bicarbonate. The resulting mixture was diluted to 2 L with water. The resulting mixture was heat-sterilized at 135° C. for 30 sec to give sample 10, which was filled in plastic containers aseptically. Evaluation of sample 10 was carried out immediately after sterilization, after preservation at 5° C. for 30 days, and after preservation at 30° C. for 30 days. A tea extract to which carrageenan was not added was designated as control 3.

Evaluation of these samples was carried out according to the method described in Example 1. Result of the evaluation is summarized in Table 3.

As shown in Table 3, control 3 did not have turbidness immediately after sterilization, but became turbid during preservation, and the taste was deteriorated. The sample to which carrageenan was added did not give any turbidness, and kept the taste without changing during preservation. It was confirmed that carrageenan can prevent formation of precipitates and can keep the taste at a wide range of concentration for drinking.

EXAMPLE 4

A tea extract was prepared ab initio in a concentration suitable to drink (similar to Example 3). To the obtained extract were added lemon juice and sugar to give a mixture at low pH. Effect of carrageenan on formation of precipitates and deterioration of taste during preservation was evaluated with the obtained mixture.

Twenty g of leaves of black tea was extracted with hot water at 80° C. to give an extract having a Bx of 0.4, a pH of 5.1 and containing 54 mg of tannin. To the obtained extract were added lemon juice at 0.5 wt. % and sugar at 5 wt. %, and carrageenan at 0.002 wt. %. The pH of the obtained mixture was adjusted to 3.8 with sodium bicarbonate. The volume of the obtained mixture was adjusted to 2 L with water, followed by heat sterilization at 110° C. for 30 sec to give sample 11, which was filled in plastic containers aseptically. Evaluation of sample 11 was carried out according to the method described in Example 1 immediately after the sterilization, after preservation at 5° C. for 30 days, and after preservation at 30° C. for 30 days. A tea extract which was prepared similarly except addition of carrageenan was designated as control 4. The result is summarized in Table 4.

TABLE 3

|  | Concentration of carrageesan (wt %) | Immediately after sterilization | | After storage at 5° C. for 30 days | | After storage at 30° C. for 30 days | |
| --- | --- | --- | --- | --- | --- | --- | --- |
|  |  | Formation of insoluble matter | Taste | Formation of insoluble matter | Taste | Formation of insoluble matter | Taste |
| Control 3 | — | ○ | 3 | x | 4 | Δ | 4 |
| Sample 10 | 0.002 | ○ | 3 | ○ | 3 | ○ | 3 |

TABLE 4

| | Concentration of carrageesan (wt %) | Immediately after sterilization | | After storage at 5° C. for 30 days | | After storage at 30° C. for 30 days | |
|---|---|---|---|---|---|---|---|
| | | Formation of insoluble matter | Taste | Formation of insoluble matter | Taste | Formation of insoluble matter | Taste |
| Control 4 | — | Δ | 3 | x | 4 | x | 4 |
| Sample 11 | 0.002 | ○ | 3 | ○ | 3 | Δ | 3 |

As shown in Table 4, remarkable turbidity was not observed with control 4 immediately after the sterilization, but turbidity and precipitates were formed and the taste was also deteriorated during preservation. With respect to the mixture to which carrageenan was added, precipitates were not formed, and kept the taste without changing bitterness not only immediately after sterilization but also during preservation. It was confirmed that carrageenan could prevent formation of precipitates and deterioration of taste even in the presence of lemon juice and sugar.

EXAMPLE 5

Effect of carrageenan on a tea extract which was chilled to remove turbidity-giving components was evaluated with respect to formation of insoluble solid matter and change in taste.

Two thousand and five hundred g of leaves of black tea was extracted with 20 L of hot water at 70° C. to give an extract having a Bx of 3.1 and a pH of 5.4 and containing 583 mg of tannin. The obtained extract was chilled at 5° C. to remove insoluble solid matter. To the obtained supernatant were added ascorbic acid at 0.3 wt. % and carrageenan at 0.05 wt. %. The pH of the obtained mixture was adjusted to 6.2. The volume of the obtained mixture was adjusted to 20 L with water, followed by sterilization at 135° C. for 30 min to give sample 12, which was filled in BIB (bag-in-box) containers aseptically. Evaluation was carried out immediately after the sterilization, after preservation at 5° C. for 30 days. and after preservation at 30° C. for 30 days. A tea extract treated similarly except addition of carrageenan was designated as control 5. A tea extract treated similarly except precipitate-removing by chilling was designated as control 6. A tea extract treated similarly except precipitate-removing by chilling and addition of carrageenan was designated as control 7.

Evaluation of these samples and controls were carried out by the method described in Example 1 to give the result summarized in Table 5.

TABLE 5

| | Certrifugation at a low temperature | Addition of carrageenan | Immediately after sterilization | | After storage at 5° C. for 30 days | | After storage at 30° C. for 30 days | |
|---|---|---|---|---|---|---|---|---|
| | | | Formation of insoluble matter | Taste | Formation of insoluble matter | Taste | Formation of insoluble matter | Taste |
| Control 5 | Yes | No | Δ | 3 | x | 4 | x | 4 |
| Control 6 | No | Yes | Δ | 3 | Δ | 3 | Δ | 3 |
| Control 7 | No | No | x | 4 | x | 5 | x | 4 |
| Sample 12 | Yes | Yes | Δ | 2 | Δ | 2 | Δ | 3 |

As shown in Table 5, controls 5 and 7 did not have remarkable turbidity immediately after sterilization, but turbidity and precipitates were formed during preservation to deteriorate its appearance and taste. The tea extract to which carrageenan was added did not form turbidity and precipitates and did not change bitterness in taste not only immediately after sterilization but also during preservation. The tea extract treated by both chilling to remove precipitates and addition of carrageenan, i.e., a tea extract prepared by removing insoluble solid matter by chilling followed by addition of carrageenan did not form turbidity or precipitates and kept the taste without changing bitterness. It was confirmed that a tea extract treated by both precipitate-removing by chilling and adding carrageenan, i.e., a tea extract obtained by hot water extraction, by chilling to remove turbidity-forming components, followed by adding carrageenan, did not give turbidity or precipitates, and did not change bitterness, and had enhanced stability against long-term preservation, compared with a tea extract which was treated only with carrageenan.

EXAMPLE 6

To know any possible effect of addition of carrageenan when a tea extract was treated by tannase and chilling to remove precipitates, i.e., tannase was added to a tea extract, followed by chilling to remove insoluble solid matter, evaluation was carried out with respect to formation of insoluble solid matter and deterioration of taste.

Two thousand and five hundred g of leaves of green tea was extracted, by a method similar to Example 5, with 20 L of hot water at 70° C. to give an extract having Bx of 3.1 and a pH of 5.4 and containing 583 mg of tannin. To the obtained extract was added tannase at 0.02 wt. %. The resulting mixture was allowed for enzyme reaction at 35° C. for 90 min, chilled at 5° C., followed by removing insoluble solid matter. To the obtained supernatant were added sodium ascorbate at 0.3 wt. % and carrageenan at 0.05 wt. %. The pH of the obtained mixture was adjusted to 6.2 with sodium bicarbonate. The volume of the obtained mixture was adjusted to 20 L, followed by sterilization at 135° C. for 30 sec to give sample 13, which was filled in BIB (bag-in-box) containers aseptically. Evaluation was carried out according to the method describe in Example 1 immediately after the sterilization, after preservation at 5° C. for 30 days, and after preservation at 30° C. for 30 days. A tea extract treated similarly except addition of carrageenan was designated as control 8.

Result is shown in Table 6.

Two hundred g of leaves of oolong tea was extracted with 2 L of hot water at 90° C. The obtained extract was condensed with an evaporat or to give a thick extract having a Bx of 11.5 and a pH of 4.9 and containing 1,260 mg of tannin. To the obtained thick extract was added carrageenan at 0.10 wt. %. The pH of the resulting mixture was adjusted to 6.5 to give sample 14, which was filled in cans at 90° C., and evaluation was carried out according to the method described in Example 1 immediately after the filling, after preservation at 5° C. for 30 days, and after preservation in frozen state for 30 days. A tea extract prepared similarly except addition of carrageenan was designated as control 9.

TABLE 6

| | Addition of tannase | Removing refrigeration | Addition of carrageenan | Immediately after sterilization | | After storage at 5° C. for 30 days | | After storage at 30° C. for 30 days | |
|---|---|---|---|---|---|---|---|---|---|
| | | | | Formation of insoluble matter | Taste | Formation of insoluble matter | Taste | Formation of insoluble matter | Taste |
| Control 8 | Yes | Yes | No | Δ | 3 | x | 4 | x | 4 |
| Sample 13 | Yes | Yes | Yes | ○ | 2 | Δ | 2 | ○ | 2 |

Result is shown summarized in Table 7.

TABLE 7

| | Removing insoluble matter by chilling | Addition of carrageenan | Immediately after sterilization | | After storage at 5° C. for 30 days | | After storage in frozen state for 30 days | |
|---|---|---|---|---|---|---|---|---|
| | | | Formation of insoluble matter | Taste | Formation of insoluble matter | Taste | Formation of insoluble matter | Taste |
| Control 9 | Yes | No | Δ | 3 | x | 4 | x | 4 |
| Sample 14 | Yes | Yes | ○ | 2 | Δ | 3 | ○ | 2 |

As shown in Table 6, control 8 did not have remarkable turbidness immediately after sterilization, but formed turbidness and precipitates during preservation to deteriorate appearance and taste. The tea extract treated by tannase, precipitate-removing by chilling, and carrageenan, i.e., the tea extract which was treated with tannase and chilled to remove insoluble solid matter, then to which carrageenan was added did not give turbidness or precipitates, and kept the taste without changing bitterness of taste, and enhanced stability against long-term preservation, compared with the tea extract treated without tannase with precipitate-removing by chilling and addition of carrageenan, i.e., sample 12 of Example 6.

EXAMPLE 7

To know the effect of carrageenan on other kind of tea extract which was condensed, evaluation was carried out with respect to formation of precipitates and taste.

As shown in Table 7, control 9 formed precipitates easily. Especially an extract obtained by defrosting formed a lot of precipitates and the taste was seriously deteriorated. On the other hand, the extract to which carrageenan was added formed turbidness or precipitates only slightly and kept the taste without changing bitterness not only immediately after sterilization but also during preservation. It could be confirmed that formation of precipitates and deterioration of taste could be prevented also with other kind of tea extract.

As described above, according to the present invention, tea extract having excellent taste and clarity, therefore having high commercial value could be obtained by adding carrageenan, which could prevent formation of precipitates caused by heating or defrosting of proteins or polysaccharides contained in the tea extract or by aggregation with tannin, for example, by long-term preservation.

The stability against long-term preservation could be more enhanced by combining prior arts, such as precipitate-removing by chilling and treatment with tannase, with addition of carrageenan.

According to the present invention, formation of precipitates can be prevented, so that steps such as filtration and centrifugation become unnecessary, and decrease in yield by removing precipitates and deterioration of taste can be avoided.

In addition, according to the present invention, in case thick tea extracts are diluted to a concentration suitable to drink, variability in quality of products concerning taste and color can be minimized.

According to the present invention, such a trouble can be minimized that precipitates formed narrow the outlet port so that dispensing a tea extract is prevented and filling in a constant volume become impossible.

What is claimed is:

1. Tannin containing tea extracts stabilized for long-term preservation, wherein said tea extracts contain from 0.0005 to 0.3 wt % of carrageenan comprising 30–100 wt % of kappa-type carrageenan.

2. The tea extracts according to claim 1, containing from 0.005 to 0.1 wt % of said carrageenan.

3. The tea extracts according to claim 2, wherein said tea extracts contain (Bx) concentration of soluble solids from 0.2 to 18.

4. A method of producing tea extracts stabilized for long-term preservation, comprising the step of:

adding to tannin-containing tea extracts, carrageenan containing 30–100 wt % of kappa-type carrageenan in a total amount of 0.005–0.3 wt %.

5. The method of claim 4, wherein 0.005 to –0.1 wt % total amount of carrageenan is added.

6. The method of claim 5, further comprising the step of:

cooling said tea extracts prior to said step of adding said carrageenan, to thereby remove turbidity components.

7. The method of claim 5, further comprising the step of:

adding tannase prior to said step of adding carrageenan.

8. The method of claim 6, further comprising the step of:

adding tannase prior to said step of cooling said tea extracts.

9. The tea extracts stabilized for long-term preservation according to claim 1, wherein insolubilization of proteins or polysaccharides in the tea extracts caused by heating or freezing of the same and aggregation with tannins occurring during long-term preservation, are both prevented.

10. The method of claim 5, wherein insolubilization of proteins or polysaccharides in the tea extracts caused by heating or freezing the tea extracts and aggregation with tannins occurring during long-term preservation, are both prevented.

11. The method of claim 6, wherein said step of cooling involves chilling said tea extracts to a temperature of about 5° C.

12. The method of claim 6, wherein said tea extracts are cooled immediately prior to the step of adding said carrageenan.

13. The method of claim 8, wherein said tea extracts are cooled immediately after adding said tannase and prior to said step of adding said carrageenan.

14. The method of claim 13, wherein said step of cooling involves chilling said tea extracts to a temperature of about 5° C.

15. The method of claim 12, wherein said step of cooling involves chilling said tea extracts to a temperature of about 5° C.

* * * * *